March 23, 1937.  H. S. WHITE  2,074,631
ENGINE COOLING SYSTEM
Filed April 1, 1936
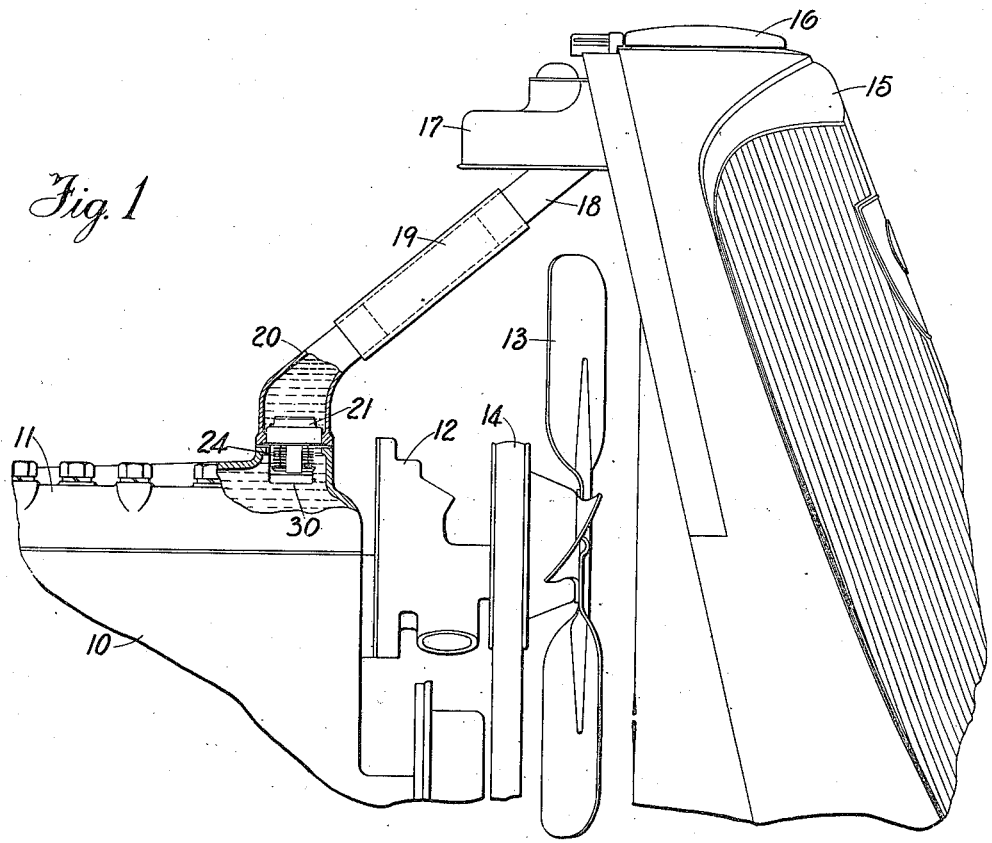
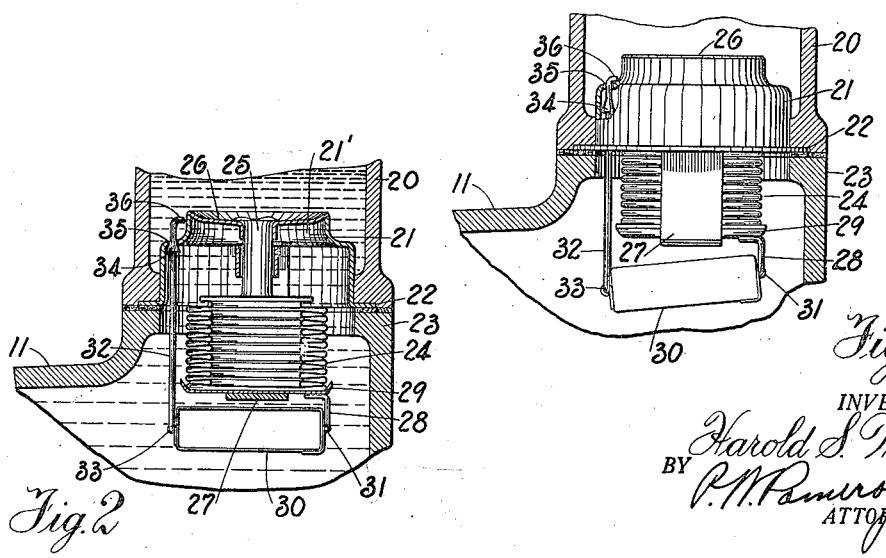
INVENTOR.
Harold S. White
BY
ATTORNEYS.

Patented Mar. 23, 1937

2,074,631

UNITED STATES PATENT OFFICE 2,074,631

ENGINE COOLING SYSTEM

Harold S. White, South Bend, Ind., assignor to The Studebaker Corporation, South Bend, Ind., a corporation of Delaware Application April 1, 1936, Serial No. 72,133

4 Claims. (Cl. 123—178)

This invention relates to internal combustion engines and particularly the cooling system therefor, one of the primary objects being to provide in an engine fluid cooling system, a thermostatically controlled valve and a by-pass valve operative independently of the thermostatically controlled valve to permit substantially the complete filling of the system with fluid.

Another object is to provide in an engine fluid cooling system, a thermostatically controlled valve and a fluid controlled by-pass valve operated independently of the thermostatically controlled valve whereby the fluid-containing space in the engine may be substantially filled regardless of whether the thermostatically controlled valve is open or closed.

Another object is to provide in an engine fluid cooling system, a thermostatically controlled valve and a fluid controlled by-pass valve operated independently of the thermostatically controlled valve whereby the fluid-containing space in the engine may be substantially filled, the by-pass valve being positioned relative to the thermostatically controlled valve so that the temperature responsive element thereof will be immersed in the fluid when the engine fluid-containing space is filled.

Another object is to provide in an engine fluid cooling system, a thermostatically controlled valve and a fluid controlled by-pass valve, the two valves being operative independently of each other but being in spaced relationship so that the temperature responsive element of the thermostatically controlled valve is immersed in the fluid when the engine fluid-containing space is filled.

Another object is to provide in an engine fluid cooling system, a thermostatically controlled valve and a fluid controlled by-pass valve so operative that filling the cooling system with fluid the air is vented around the thermostatically controlled valve and the fluid is then restrained from circulating past the by-pass valve.

Other objects, and objects relating to details of construction and methods of operation will be apparent from the drawing and the detailed description to follow.

Referring to the accompanying drawing which shows one embodiment of my invention and in which like numerals refer to like parts throughout the several views:

Fig. 1 is a fragmentary side elevational view of a fluid cooled internal combustion engine, radiator, and the connections therebetween, certain parts being broken away to better illustrate a thermostatic device inserted in the cooling system and my invention included therewith;

Fig. 2 is an enlarged detailed sectional view looking in the same direction as Fig. 1, showing a thermostatic device and a fluid controlled by-pass valve in the fluid circulating system, the by-pass valve being in closed position;

Fig. 3 is a view similar to Fig. 2 showing the by-pass valve in open position.

Heretofore it has been the common practice to insert a thermostatic device in the fluid cooling system of an internal combustion engine to limit the circulation of fluid at cold temperatures, thus to provide a quicker warming up of the engine and easier operation thereof in cold weather. With the use of such thermostatic device either an opening was provided in the shell of the thermostat to permit a small amount of air or fluid to pass by the thermostat to the header tank in the radiator which would prevent the heat responsive element of the thermostat from operating at the predetermined temperature or if no vent was provided, it was impossible to completely fill the circulating system with fluid when the thermostat valve was closed because of the air gap between the level of the fluid in the engine and the thermostat. By my invention I have provided a means whereby the difficulties heretofore encountered have been eliminated and the fluid circulating system can be substantially filled with fluid without interfering with the operation of the thermostatic device at the temperatures for which the same is designed to function.

In order that those skilled in the art may better understand my invention reference will be had to the accompanying drawing in which I have shown a fragmentary portion of a fluid cooled internal combustion engine 10 having a cylinder head 11, and a pump 12 rotatably supporting a fan 13 thereon driven by the belt 14 from any suitable power source. The radiator 15 is provided with a filler cap 16 through which fluid may be poured into the header tank 17 having a tubular extension 18 coupled by a hose or other suitable means 19 to the engine fluid outlet 20 attached in any suitable manner to the cylinder head 11 to thus provide a circulating system between the radiator 15 and the engine 10.

I have illustrated a thermostatic device comprising a casing 21 having an outturned flange 22 fitted between the outlet member 20 and the flange 23 on the cylinder head 11. The heat responsive element 24 is provided with a stem 25 secured to the valve 26, as is clearly shown in Fig. 2, which is operative by the expansion and contraction of the element 24 to open and close the opening 21' in the casing 21 to permit circulation of the fluid between the radiator 15 and engine 10 when the valve 26 is raised out of contact with the casing 21 and prevent fluid circulation between the radiator and engine when the valve 26 is seated on the casing 21. The heat responsive element 24 is supported on the head of the U-shaped bracket 27 having the legs thereof secured to the flange 23. I have shown a bracket 28 secured to the plate 29 interposed between the head of the bracket 27 and the heat responsive element 24 on which is hingedly mounted a float 30 as at 31. A valve stem 32 hingedly supported at 33 on the float 30 is provided with a valve 34 at its upper end which is adapted to open or close the by-pass opening 35 formed in the casing 21. The valve stem 32 preferably extends through the opening 35 and terminates in a hook portion 36 which prevents the valve from dropping below a predetermined position as shown in Fig. 3.

When the thermostat valve 26 is in closed position or seated on the casing 21 and it is desired to fill the cooling system with fluid, the float 30 will be in the position shown in Fig. 3 so that the by-pass valve 34 is moved out of engagement with the casing 21 to permit air above the fluid level in the engine to pass through the by-pass opening 35 and out through the radiator whereby the fluid space in the engine will be substantially filled with fluid. When the fluid in the cylinder head 11 reaches the level of the float 30 the same will raise to seat the valve 34 in the by-pass opening 35 as shown in Fig. 2. Upon closing of the valve 34 in the by-pass opening 35 the connection between the radiator and cylinder head may also be filled with fluid so that upon a subsequent lowering of the float 30 fluid may pass through the by-pass opening 35 to thus again fill the fluid space in the cylinder head. It will thus be seen that the fluid space in the engine may be filled with fluid without interfering with the heat responsive element 24 and that when the fluid space in the engine is thus filled with fluid that the heat responsive element will be immersed therein so that the thermostatic device will operate at the temperatures for which it is designed to function as the air pocket in fluid space in the engine is eliminated.

While I have shown the float 30 and a by-pass valve 34 as being supported by the thermostatic device, such arrangement of parts is for the purpose of illustration only as it will be well understood by those skilled in the art that the means to permit the by-pass of air around the thermostatic device may be positioned and supported entirely independent thereof. However, it is preferred that the by-pass valve be positioned relative to the heat responsive element of the thermostat so that when the engine fluid space is filled with fluid that the heat responsive element will be immersed therein.

Although I have illustrated and described one embodiment of my invention, it is to be understood that my invention is not to be limited to the specific construction illustrated and described but that such modifications and changes can be made therein which would occur to those skilled in the art without departing from the spirit and substance of my invention, the scope of which is to be limited entirely by the subjoined claims.

What I claim is:

1. In an engine fluid cooling system, a thermostatically controlled valve therein, a float operative by the fluid in said system, and a valve movable by said float to permit the escape of air from above the fluid level in said engine and to thereby permit substantially the complete filling of the fluid space in said engine with fluid.

2. In an engine fluid cooling system, a thermostatic device having a temperature controlled element therein, a float operative by the fluid in said engine, and a valve movable by said float positioned above said element to permit the escape of air from above the fluid level in said engine and cause said element to be immersed in the fluid when the engine fluid cooling space is filled.

3. In an engine fluid cooling system, a thermostatic device having a casing and a temperature responsive element therein, a float supported by said thermostatic device adapted to move upwardly by the fluid in said engine, a by-pass opening in said casing, and a valve operable by said float to close said by-pass opening when the engine fluid containing space is filled with fluid.

4. In an engine fluid cooling system, a thermostatic device having a casing provided with a by-pass opening therein, a float pivotally supported by said thermostatic device, a valve stem supported by said float extending through said opening, and a valve on said stem normally seating in said by-pass opening operable by said float to uncover said opening and permit the escape of air from above the fluid level in said engine and to thereby permit substantially the complete filling of the engine fluid containing space.

HAROLD S. WHITE.